US006574623B1

(12) United States Patent
Leung et al.

(10) Patent No.: US 6,574,623 B1
(45) Date of Patent: Jun. 3, 2003

(54) QUERY TRANSFORMATION AND SIMPLIFICATION FOR GROUP BY QUERIES WITH ROLLUP/GROUPING SETS IN RELATIONAL DATABASE MANAGEMENT SYSTEMS

(75) Inventors: Ting Yu Leung, San Jose, CA (US); Haixun Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 09/639,021

(22) Filed: Aug. 15, 2000

(51) Int. Cl.⁷ .............................. G06F 17/30; G06F 7/00
(52) U.S. Cl. ..................... 707/5; 707/3; 707/4
(58) Field of Search ................ 707/1–10, 100–104.1

(56) References Cited

U.S. PATENT DOCUMENTS

| | | | | |
|---|---|---|---|---|
| 5,446,885 A | * | 8/1995 | Moore et al. | 707/103 R |
| 5,546,576 A | | 8/1996 | Cochrane et al. | |
| 5,590,324 A | | 12/1996 | Leung et al. | |
| 5,598,559 A | * | 1/1997 | Chaudhuri | 707/2 |
| 5,713,015 A | | 1/1998 | Goel et al. | |
| 5,778,355 A | | 7/1998 | Boyer et al. | |
| 5,822,748 A | | 10/1998 | Cohen et al. | |
| 5,822,751 A | | 10/1998 | Gray et al. | |
| 5,832,475 A | | 11/1998 | Agrawal et al. | |
| 5,905,982 A | | 5/1999 | Carey et al. | |
| 5,963,936 A | * | 10/1999 | Cochrane et al. | 707/23 |
| 5,987,455 A | | 11/1999 | Cochrane et al. | |
| 5,991,754 A | * | 11/1999 | Raitto et al. | 707/2 |
| 6,199,063 B1 | * | 3/2001 | Colby et al. | 707/4 |
| 6,339,770 B1 | * | 1/2002 | Leung et al. | 707/102 |
| 6,341,281 B1 | * | 1/2002 | MacNicol et al. | 707/2 |
| 6,496,819 B1 | * | 12/2002 | Bello et al. | 707/3 |

OTHER PUBLICATIONS

IBM Technical Disclosure Bulletin, "Alternative Results in Null Field Operations", vol. 37, No. 7, Jul. 1994, pp 487–488.
Chatziantoniou, D., et al., "Groupwise Processing of Relational Queries", Proceedings of the Twenty–third International Conference on Very Large Databases, 1997, (1–page Abstract).
Goel, P., et al. "SQL Query Optimization: Reordering for a General Class of Queries", SIGMOD Record, vol. 25, No. 2, Jun. 1996, (1–page Abstract).
Chadhuri, S., et al., "Optimizing Queries with Aggregate Views", Advances in Database Technology—EDBT '96. 5$^{th}$ International Conference on Extending Database Technology. Proceedings, 1996, (1–page Abstract).

* cited by examiner

Primary Examiner—Greta Robinson
Assistant Examiner—Linh Black
(74) Attorney, Agent, or Firm—Gates & Cooper LLP

(57) ABSTRACT

A method, apparatus, and article of manufacture for optimizing database queries, wherein the query is analyzed to determine whether the query includes at least one GROUP BY operation that computes at least one of the following: (1) a ROLLUP and (2) a GROUPING SET, and when it does, the query is rewritten to optimize one or more predicates that are applied after the GROUP BY operation. The query is also analyzed to determine whether the query includes at least one GROUP BY operation that computes two or more stacked GROUP BY operations, and when it does, the query is rewritten to collapse the stacked GROUP BY operations into a single GROUP BY operation.

21 Claims, 10 Drawing Sheets

QUERY TRANSFORMATION AND SIMPLIFICATION FOR GROUP BY QUERIES WITH ROLLUP/GROUPING SETS IN RELATIONAL DATABASE MANAGEMENT SYSTEMS

BACKGROUND OF THE INVENTION

1. Field of the Invention.

This invention relates in general to database management systems performed by computers, and in particular, to the optimization of queries that include at least one GROUP BY operation that computes a ROLLUP function, a GROUPING SETS function, or stacked GROUP BY operations in a relational database management system.

2. Description of Related Art.

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

RDBMS software typically has the capability of analyzing data based on particular columns of a table. For example, rows can be grouped according to columns defined in a GROUP BY clause of a query. The column names in a SELECT clause are either a grouping column or a column function. Column functions return a result for each group defined by the GROUP BY clause.

A grouping query can include a standard WHERE clause that eliminates non-qualifying rows before the groups are formed and the column functions are computed. A HAVING clause eliminates non-qualifying rows after the groups are formed; it can contain one or more predicates connected by ANDs and ORs, wherein each predicate compares a property of the group (such as AVG(SALARY)) with either another property of the group or a constant.

The GROUPING SET operator extends the GROUP BY operation to simultaneously specify the computation of multiple GROUP BYs in a single GROUP BY operation. When the GROUPING SET operator is used, a NULL value in a non-null grouping column denotes that the particular column is collapsed in the aggregation. If a grouping column (c) is nullable, a GROUPING operator (GROUPING(c)) is required to distinguish between the NULL group and a column collapsed in the aggregation. Used in conjunction with GROUPING SETS, the GROUPING operator returns a value which indicates whether or not a row returned in a GROUP BY answer set is a row generated by a GROUPING SET that excludes the column represented by the expression. The argument can be of any type, but must be an item of a GROUP BY clause. The result of the function is set to one of the following values:

1—The value of expression in the returned row is a null value, and the row was generated by a super-group. That is, the argument is collapsed in the aggregation.

0—The value of the expression in the returned row represents a non-system generated value of the group (which may be null and indicates that the argument is not collapsed in the aggregation.

ROLLUP operations can also be specified in the GROUP BY clause of a query. ROLLUP operations are shorthand for GROUPING SETS that represent common sets of GROUP BY operations that are required for common queries for online analytical processing (OLAP). ROLLUP grouping produces a result set containing the regular grouped rows and sub-total rows. For example, ROLLUP can provide the sales by person by month with monthly sales totals and an overall total.

However, the current state of the art does not optimize predicates in queries that are performed after the GROUP BY operations. Thus, there is a need in the art for improved optimization techniques for such queries.

SUMMARY OF THEE INVENTION

To overcome the limitations in the prior art described above, and to overcome other limitations that will become apparent upon reading and understanding the present specification, the present invention discloses a method, apparatus, and article of manufacture for optimizing database queries, wherein the query is analyzed to determine whether the query includes at least one GROUP BY operation that computes at least one of the following: (1) a ROLLUP and (2) a GROUPING SET, and when it does, the query is rewritten to optimize one or more predicates that are applied after the GROUP BY operation. The query is also analyzed to determine whether the query includes at least one GROUP BY operation that computes two or more stacked GROUP BY operations, and when it does, the query is rewritten to collapse the stacked GROUP BY operations into a single GROUP BY operation.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

OVERVIEW

The present invention describes optimization techniques that handle query transformation and simplification for SQL queries when the queries include ROLLUP and GROUPING SETS constructs, as well as stacked GROUP BY operations. In particular, the present invention optimizes queries with predicates to be applied after the GROUP BY with ROLLUP or GROUPING SETS, and the present invention optimizes queries with stacked GROUP BY operations to collapse the stacked GROUP BY operations into a single GROUP BY operation.

HARDWARE AND SOFTWARE ENVIRONMENT

Figure 1:
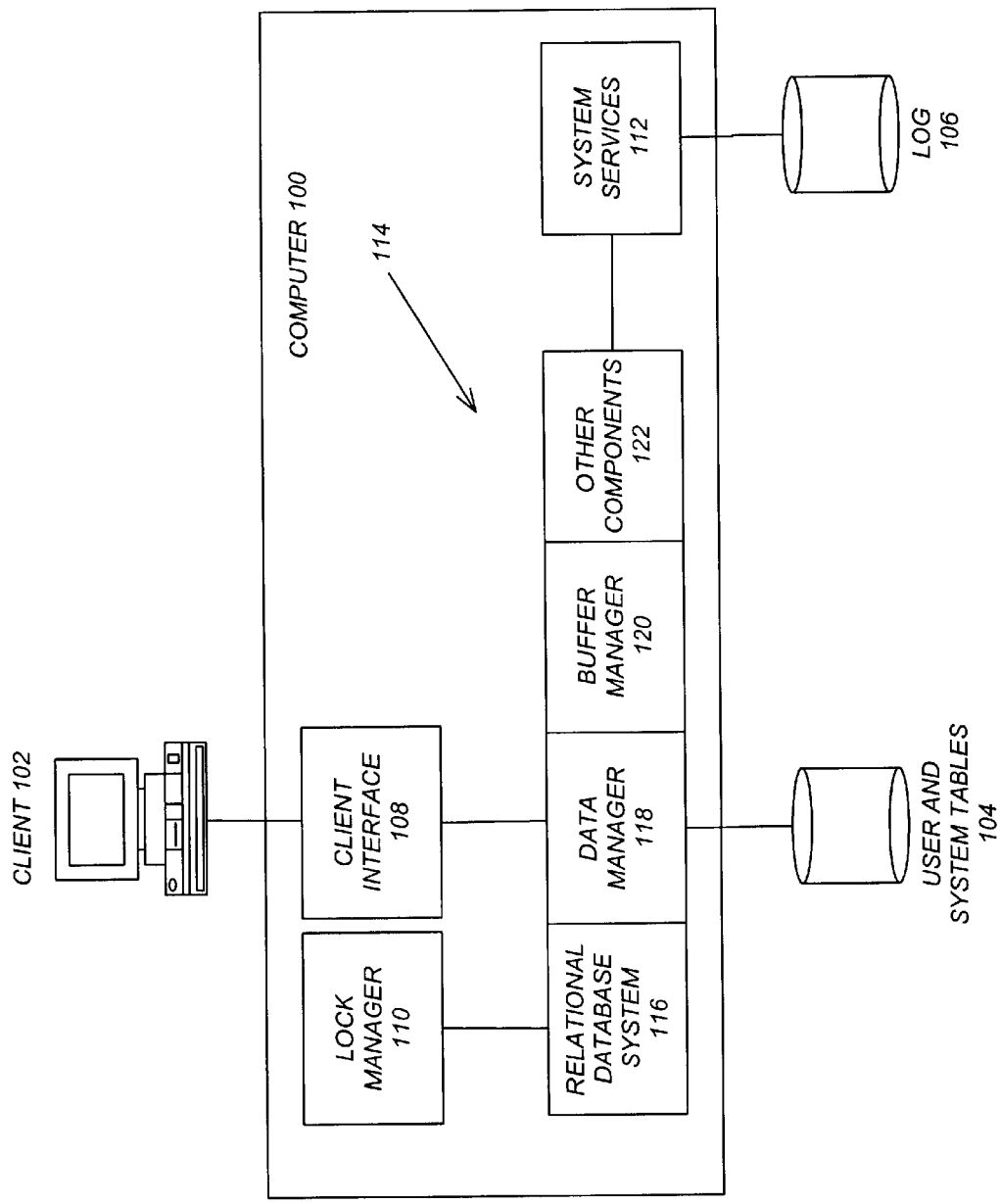
FIG. 1 illustrates the computer hardware environment of the present invention.

FIG. 1 illustrates an exemplary computer hardware and software environment that could be used with the present invention. In the exemplary environment, a server system 100 is connected to one or more client systems 102, in order to manage one or more databases 104 and 106 shared among the client systems 102.

Operators of the client systems 102 use a standard operator interface 108, such as IMS/DB/DC CICS, TSO, OS/2 or other similar interface, to transmit electrical signals to and from the server system 100 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS, UNIX, WINDOWS or OS/2 operating systems. Those skilled in the art will recognize, however, that the present invention has application to any RDBMS software.

As illustrated in FIG. 1, the DB2 product includes three major components: the Resource Lock Manager (RLM) 110, the Systems Services module 112, and the Database Services module 114. The RLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the heart of the DB2 architecture is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, medium, or carrier, e.g., a memory, a data storage device, a remote device coupled to the server computer 100 by a data communications device, etc. Moreover, these instructions and/or data, when read, executed, and/or interpreted by the server computer 100, cause the server computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

INTERACTIVE SQL EXECUTION

Figure 2:
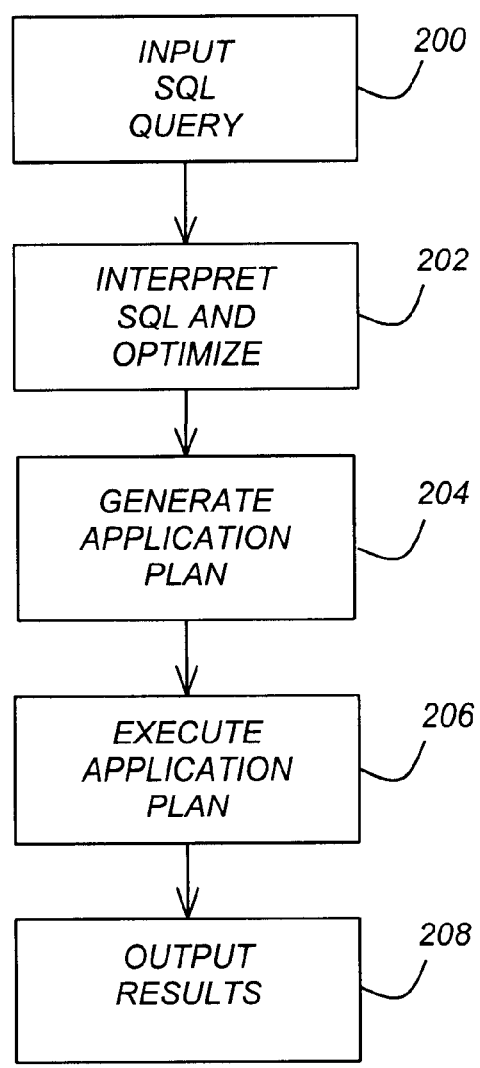
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 200 represents the input of SQL statements into the server system 100. Block 202 represents the step of compiling or interpreting the SQL statements. An optimization function within block 202 may transform or optimize the SQL query in a manner described in more detail later in this specification. Generally, the SQL statements received as input specify only the desired data, but not how to retrieve the data. Tis step considers both the available access paths (indexes, sequential reads, etc.) and system held statistics on the data to be accessed (the size of the table, the number of distinct values in a particular column, etc.), to choose what it considers to be the most efficient access path for the query. Block 204 represents the step of generating a compiled set of runtime structures called an application plan from the compiled SQL statements. Block 206 represents the execution of the application plan and Block 208 represents the output of the results.

EMBEDDED/BATCH SQL EXECUTION

Figure 3:
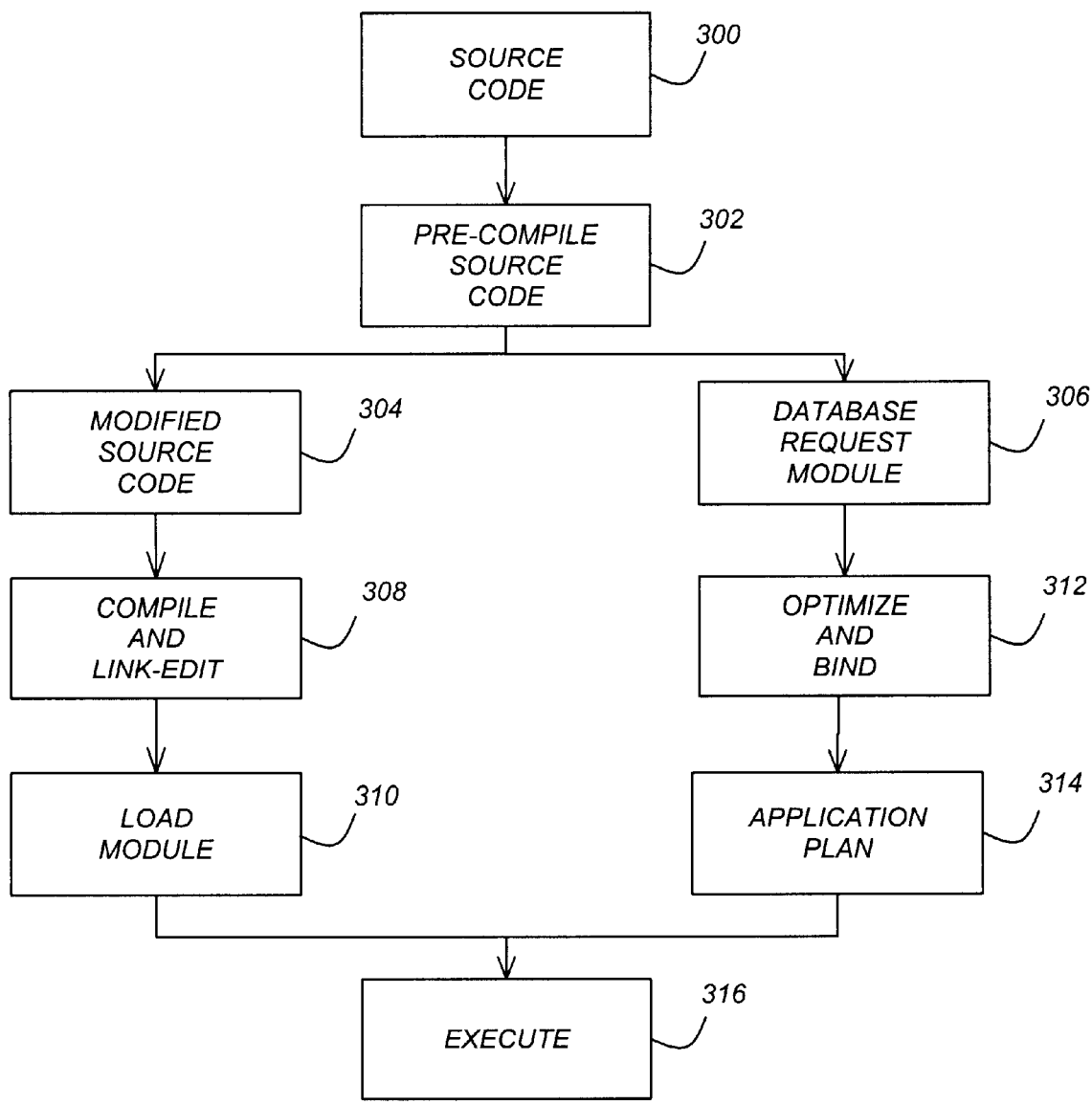
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to DB2, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the application plan 314. As indicated above in conjunction with FIG. 2, the SQL statements from the program source code 300 specify only the desired data, but not how to retrieve the data. The optimize and bind step 312 may optimize the SQL query in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and application plan 314 are then executed together at step 316.

DESCRIPTION OF THE OPTIMIZATION TECHNIQUE

The present invention discloses an improved optimization technique that is typically performed at step 202 of FIG. 2 or step 312 of FIG. 3. Specifically, the present invention discloses an improved SQL query compilation and optimization technique using Query Graph Models (QGMS).

A QGM represents a semi-procedural dataflow graph of a query, wherein the graph is comprised of nodes (or "boxes"), wherein the boxes are used to represent relational operations, while arcs between boxes are used to represent quantifiers, i.e., table references. Each box includes the predicates that it applies, an input or output order specification (if any), a distinct flag, and so on. Examples of operations include SELECT, GROUP BY, UNION, JOIN, INTERSECT, and EXCEPT, etc.

Many SQL query compilation and optimization techniques using the Query Graph Model (QGM) have been performed in the prior art, as disclosed in the publication, Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein.

The goal of the QGM is to provide a more powerful and conceptually more manageable representation of queries in order to reduce the complexity of query compilation and optimization. The structure of the QGM is central to the query rewrite mechanism, since rewriting a query corresponds to transforming its QGM.

The QGM, in the context of the present invention, is best described by means of an example. Consider the following SQL query.

---

SELECT DISTINCT Q1.PARTNO, Q1.DESCR, Q2.SUPPNO
FROM INVENTORY Q1, QUOTATIONS Q2
WHERE Q1.PARTNO = Q2.PARTNO AND
    Q1.DESCR='ENGINE' AND
    Q2.PRICE <= ALL (SELECT Q3.PRICE
        FROM QUOTATIONS Q3
        WHERE Q2.PARTNO=Q3.PARTNO);

---

This query provides information about suppliers and parts when the supplier's price is less than that of ALL other suppliers.

Figure 4:
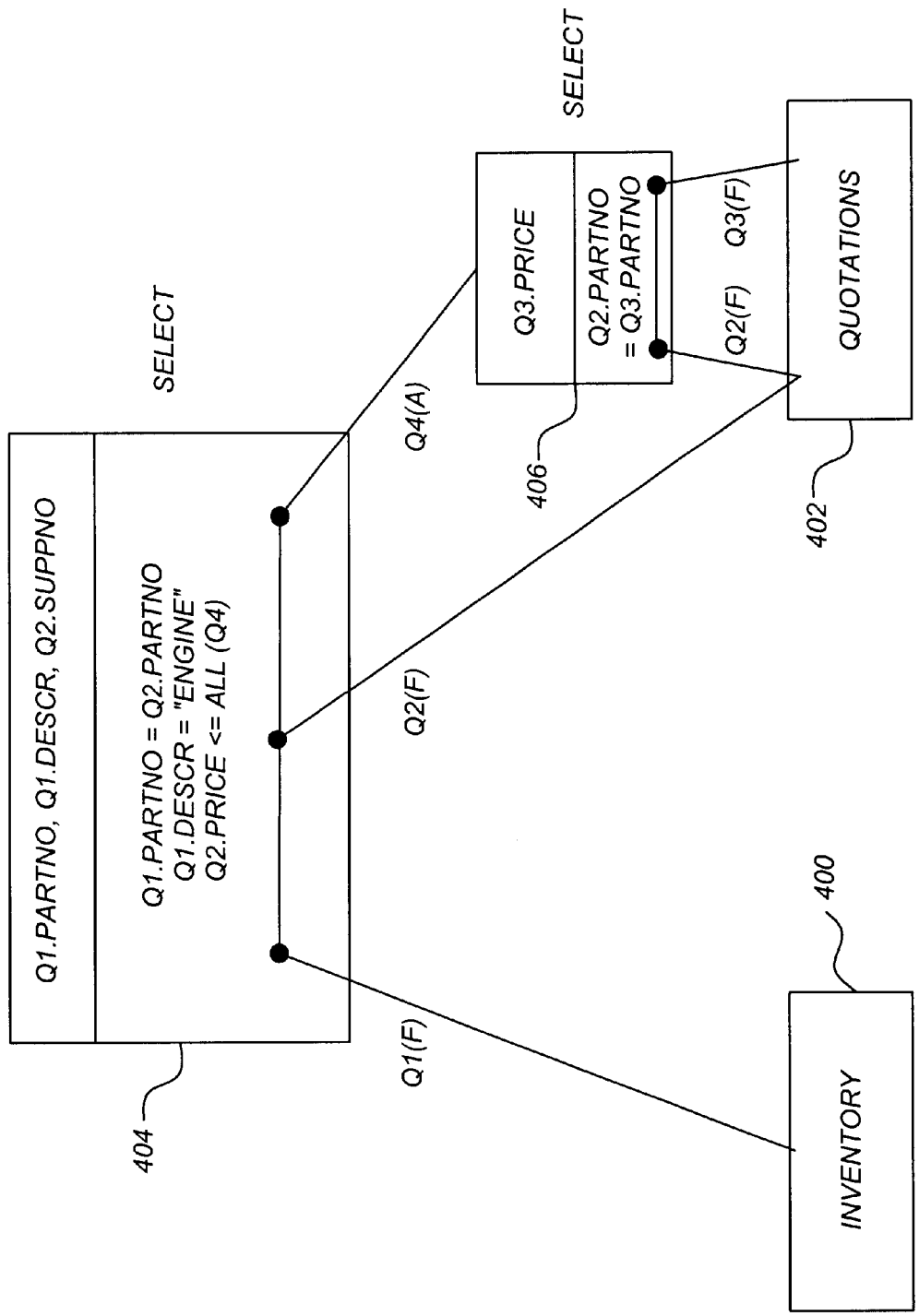
FIGS. 4, 5 and 6 are query graph models (QGMS) that illustrate queries according to the preferred embodiment of the present invention.

FIG. 4 illustrates the QGM for this query. The graph contains four boxes 400, 402, 404, and 406, wherein Boxes 400 and 402 are associated with base tables INVENTORY and QUOTATIONS, Box 404 is a SELECT box associated with the main part of the query, and Box 406 is a SELECT box associated with the subquery. Each box is comprised of two main components, i.e., a head and a body, wherein the head describes the output table produced by the box, and the body specifies the operation required to compute the output table. Base tables can be considered boxes that have empty or non-existent bodies.

With regard to Box 404, the head of this Box includes output columns PARTNO, DESCR and SUPPNO, as specified in the select list of the query. The specification of these columns includes column names, types, and output ordering information. The head has a Boolean attribute called DISTINCT that indicates whether the associated table contains only distinct tuples (head.distinct=TRUE), or whether it may contain duplicates (head.distinct=FALSE).

The body of a Box contains a graph. The vertices of this graph (dark circles in the diagrams) represent quantified tuple variables, called QUANTIFIERS. In Box 404, there are quantifiers Q1, Q2, and Q4. Quantifiers Q1 and Q2 range over the base tables INVENTORY and QUOTATIONS, respectively, and correspond to the table references in the FROM clause of the SQL query. Note that nodes Q1 and Q2 are connected via an inter-box edge to the head of the INVENTORY and QUOTATIONS boxes. The edge between Q1 and Q2 specifies the join predicate. The (loop) edge attached to Q1 is the local predicate on Q1. In fact, each inter-quantifier edge represents a conjunct of the WHERE clause in the query block, i.e., the conjuncts being represented in the diagram by the labeled rectangle along the edge. Such edges are also referred to as Boolean factors. Quantifier Q4 is a universal quantifier, associated with the ALL subquery in the WHERE clause. This represents that for all tuples associated with Q4, the predicate represented by the edge between Q2 and Q4 is TRUE.

In Box 404, Q1 and Q2 participate in joins, and some of their columns are used in the output tuples. These quantifiers have type F (ForEach), since they come from the query's FROM clause. Quantifier Q4 has type A, representing a universal (ALL) quantifier. SQL's predicates EXISTS, IN, ANY and SOME are true, if at least one tuple of the subquery satisfies the predicate. Hence, all of these predicates are existential, and the quantifiers associated with such subqueries have type E. Each quantifier is labeled with the columns that it needs from the table it ranges over. Additionally, quantifiers may be ordered within a box to support asymmetric operators, such as EXCEPT.

In QGM, the quantifiers associated with existential and universal subqueries are called counting quantifiers. Scalar subquery quantifiers have the type S, requiring that (1) the subquery returns at most one row and (2) if the subquery does not produce any row, a null value will be returned via the S quantifier.

Box 406 represents the subquery. It contains an F quantifier Q3 over the QUOTATIONS table, and has a predicate that refers to Q2 and Q3.

The body of every box has an attribute called DISTINCT (not shown) that has a value of ENFORCE, PRESERVE or PERMIT. ENFORCE means that the operation must eliminate duplicates in order to enforce head.distinct=TRUE. PRESERVE means that the operation must preserve the number of duplicates it generates. This could be because head.distinct=FALSE, or because head.distinct =TRUE and no duplicates could exist in the output of the operation even without duplicate elimination. PERMIT means that the operation is permitted to eliminate (or generate) duplicates arbitrarily. For example, the DISTINCT attribute of Box 406 can have the value permit because its output is used in a universal quantifier (Q4 in Box 404), and universal quantifiers are insensitive to duplicate tuples.

Like each box body, each quantifier also has an attribute called DISTINCT (not shown) that has a value of ENFORCE, PRESERVE or PERMIT. ENFORCE means that the quantifier requires the table over which it ranges to enforce duplicate elimination. PRESERVE means that the quantifier requires that the exact number of duplicates in the lower table be preserved. PERMIT means that the table below may have an arbitrary number of duplicates. Existential and universal quantifiers can always have distinct= PERMIT, since they are insensitive to duplicates.

In the body, each output column may have an associated expression corresponding to expressions allowed in the select list of the query. These expressions are called head expressions.

In the preferred embodiment, the RDBMS supports derived tables, which are similar to view definitions, and can be defined anywhere a table can be used. In the RDBMS, derived tables and views, just like queries and subqueries, have a QGM, with one or many boxes. When a derived table or view is referenced in a query, its QGM becomes part of the QGM graph of the query.

The output of a box can be used multiple times (e.g., a view may be used multiple times in the same query), creating common subexpressions. In the remainder of this specification, only rough sketches of QGM graphs are used, and details that are not critical to the specification are omitted.

Overview of GROUP BY Constructs

In SQL92, GROUP BY items can be simple columns or expressions, wherein each of these grouping items is separated by a comma ",". For example, consider the following table and a simple GROUP BY query

```
CREATE TABLE T (A INT, B INT, C INT, D INT);
INSERT INTO T VALUES (1, 2, 3, 4);
INSERT INTO T VALUES (1, 2, 4, 4);
INSERT INTO T VALUES (1, 3, 5, 4);
INSERT INTO T VALUES (1, 3, 6, 4);
SELECT A, B, C COUNT(*) as COUNT
FROM T
GROUP BY A, B, C;
```

The above query returns the following results:

| A | B | C | COUNT |
|---|---|---|-------|
| 1 | 2 | 3 | 1 |
| 1 | 2 | 4 | 1 |
| 1 | 3 | 5 | 1 |
| 1 | 3 | 6 | 1 |

Similarly, consider the following GROUP BY query with expression:

```
SELECT A+B as AB, C, COUNT(*) as COUNT
FROM T
GROUP BY A+B, C;
```

The above query returns the following results:

| AB | C | COUNT |
|----|---|-------|
| 3 | 3 | 1 |
| 3 | 4 | 1 |
| 4 | 5 | 1 |
| 4 | 6 | 1 |

Since SQL92 was introduced, there has been several extensions to the GROUP BY clause. In particular, GROUPING SETS and ROLLUP are allowed. For example, the following view and query illustrates the use of GROUPING SETS function:

```
CREATE VIEW V1 (A, B, C, COUNT) AS
    (SELECT A, B, C, COUNT(*)
    FROM T
    GROUP BY GROUPING SETS (A, B, C));
```

According to the SQL semantics for "GROUPING SETS", the contents of the view V1 comprises:

| A | B | C | COUNT |
|---|---|---|-------|
| — | — | 3 | 1 |
| — | — | 4 | 1 |
| — | — | 5 | 1 |
| — | — | 6 | 1 |
| — | 2 | — | 2 |
| — | 3 | — | 2 |
| — | — | — | 4 |

Note that, in the above table, the "—" character represents a NULL value.

Following is another example involving ROLLUP:

```
CREATE VIEW V2 (A, B, C, COUNT) AS
    (SELECT A, B, C, COUNT(*)
    FROM T
    GROUP BY ROLLUP(A, B, C));
```

The contents of the view V2 comprise:

| A | B | C | COUNT |
|---|---|---|-------|
| — | — | — | 4 |
| 1 | — | — | 4 |
| 1 | 2 | — | 2 |
| 1 | 3 | — | 2 |
| 1 | 2 | 3 | 1 |
| 1 | 2 | 4 | 1 |
| 1 | 3 | 5 | 1 |
| 1 | 3 | 6 | 1 |

The present invention includes techniques that can be applied to optimizing queries involving these new GROUP BY constructs.

Optimization For Queries With GROUPING SETS

In relational databases, views are often used because views can provide a higher level of abstraction and access authorization. Complex queries can be built by referencing views. As an example, consider the following simple query referencing view V1 defined earlier:

```
SELECT*
FROM V1
WHERE A > 0;
```

In this query, the WHERE predicate will filter out any rows whose column A value is greater than 0, including the null values. That is, the query is not interested in other GROUPING SETS (B and C). Hence, the query can be equivalently simplified as:

```
SELECT A, NULL, NULL, COUNT(*) as COUNT
FROM T
GROUP BY A
```

The above query returns the following results:

| A | B | C | COUNT |
|---|---|---|---|
| 1 | — | — | 4 |

Note that the values of columns B and C are NULL, because these columns are selected. Computing the above simplified GROUP BY query is obviously faster than the original query.

Now, consider a slightly more complex query.

```
SELECT*
FROM V1
WHERE A > 0 OR B > 0;
```

When both columns A and B are NULL, the WHERE predicate becomes FALSE, and the query can then be simplified such that it requires only a subset of columns in the GROUPING SETS function:

```
SELECT A, B, NULL, COUNT(*) as COUNT
FROM T
GROUP BY GROUPING SETS (A, B);
```

The above query is equivalent to a simple union of two GROUP BY subselects:

```
SELECT A, NULL, NULL, COUNT(*) as COUNT
FROM T
GROUP BY A
UNION ALL
SELECT NULL, B, NULL, COUNT(*) as COUNT
FROM T
GROUP BY B;
```

The above query returns the following results:

| A | B | C | COUNT |
|---|---|---|---|
| — | 2 | — | 2 |
| — | 3 | — | 2 |
| 1 | — | — | 4 |

Again, the column C is always NULL. Like the previous example, this rewritten query avoids computing the GROUP BY operation for column C.

According to the optimization techniques of the present invention, the rule can be defined as follows:

1. Given a set of column references (denoted as COL) in a GROUPING SETS function, a predicate to be applied after the GROUP BY clause where the predicate is FALSE when a subset of the column references in COL are simultaneously NULL (this subset is denoted as S_COL), then the GROUPING SETS function can be simplified such as only S_COL appears in the function.

2. If S_COL is a single GROUP BY column, then the GROUPING SETS function can be effectively removed.

Optimization for Queries with ROLLUP

Consider an example to illustrate the optimization technique for queries with ROLLUP. Suppose there is a fact table SALES that stores the sales transactions, including the location of the sales, the sales date, the amount and item bought. Further, assume there is a view defined that rolls up the number of transactions along the location dimension, i.e., region, state and city:

```
CREATE TABLE SALES (ITEM, REGION, STATE, CITY, SALES_
    DATE, SALES_AMOUNT, . . . );
CREATE VIEW SUMMARY (REGION, STATE, CITY, COUNT) AS
    (SELECT REGION, STATE, CITY, COUNT(*)
    FROM SALES
    GROUP BY ROLLUP (REGION, STATE, CITY));
```

Semantically, a GROUP BY operation with "ROLLUP (REGION, STATE, CITY)" is equivalent to four different GROUP BY operations unioned together. Therefore, the view can be equivalently written as:

```
CREATE VIEW SUMMARY (REGION, STATE, CITY, COUNT) AS
(
SELECT REGION, STATE, CITY, COUNT(*)
FROM SALES
GROUP BY REGION, STATE, CITY
UNION ALL
SELECT REGION, STATE, NULL, COUNT(*)
FROM SALES
GROUP BY REGION, STATE
UNION ALL
SELECT REGION, NULL, NULL, COUNT(*)
FROM SALES
GROUP BY REGION
UNION ALL
SELECT NULL, NULL, NULL, COUNT(*)
FROM SALES
);
```

That is, the first GROUP BY operation groups on columns REGION, STATE and CITY. The second GROUP BY operation groups on only REGION and STATE. The third GROUP BY operation groups on REGION and the last GROUP BY operation has no grouping column. There are few other ways of manually rewriting the ROLLUP construct using UNION ALL and temporary tables, i.e., the focus of this invention is not on how these constructs can be implemented using UNION ALL constructs. Instead, the present invention concentrates on query optimization in presence of predicates to be applied after the GROUP BY operation.

Consider the following query that selects the sales count in Los Angeles, San Francisco and San Jose:

```
SELECT *
FROM SUMMARY
WHERE CITY IN ('LA', 'SF', 'SJ');
```

By definition, the IN predicate is FALSE if the CITY column value is NULL. The above query can then be simplified to the following:

```
SELECT REGION, STATE, CITY, COUNT(*)
FROM SALES
WHERE CITY IN ('LA', 'SF', 'SJ');
GROUP BY REGION, STATE, CITY
```

Instead of computing the entire rolled-up data, only a single GROUP BY operation is required.

Not all predicates on the view can lead to a simplified GROUP BY clause. Following is an example query that selects the sales count in California, Arizona and Oregon states:

```
SELECT *
FROM SUMMARY
WHERE STATE IN ('CA', 'AZ', 'OR');
```

The query can be simplified to the following:

```
SELECT *
FROM TABLE
(
SELECT REGION, STATE, CITY, COUNT(*)
FROM SALES
GROUP BY REGION, STATE, CITY
UNION ALL
SELECT REGION, STATE, NULL, COUNT(*)
FROM SALES
GROUP BY REGION, STATE)
AS Q(REGION, STATE, CITY, COUNT)
WHERE STATE IN ('CA', 'AZ', 'OR')
);
```

Or, equivalently using a common subexpression:

```
WITH BASE AS
(
SELECT REGION, STATE, CITY, COUNT(*) AS COUNT
FROM SALES GROUP BY REGION, STATE, CITY),
ROLLUP AS (SELECT REGION, STATE, SUM(COUNT) AS COUNT
    FROM BASE GROUP BY REGION, STATE)
SELECT REGION, STATE, CITY, COUNT
FROM BASE
UNION ALL
SELECT REGION, STATE, NULL AS CITY, COUNT
FROM ROLLUP
);
```

Essentially, the predicate filters out the rows due to the data along the ROLLUP hierarchy. In the first example, where the predicate involves the CITY column, rows for STATE, REGION and above in the ROLLUP hierarchy are eliminated when the CITY column is NULL. In the second example, where the predicate involves the STATE column, rows for REGION and above in the ROLLUP hierarchy are eliminated when the STATE column is NULL, resulting effectively two GROUP BYs unioned together.

According to the optimization techniques of the present invention, the rule can be defined as follows:

1. Consider ROLLUP (COL1, COL2, ..., COLn) where by definition COL1 is the highest level in the ROLLUP hierarchy. Suppose a predicate is to be applied after the GROUP BY clause where the predicate is FALSE when one of the grouping column (denoted as COLi, where i is between 1 and n) is NULL.
2. If COLi is exactly COLn, then the ROLLUP function can be eliminated resulting in COL1, COL2, ..., COLn.
3. If COLi is not COLn, then the grouping results due to higher level of ROLLUP do not contribute to the answer set, and hence their computation can be eliminated. Effectively, this results in (n−i+1) different GROUP BYs unioned together:

```
GROUP BY COL1, COL2, ..., COLi
GROUP BY COL1, COL2, ..., COLi + 1
...
GROUP BY COL1, COL2, ..., COLn
```

Optimization For Stacked GROUP BY Operations

The following example illustrates the idea of optimization of a GROUP BY query involving another GROUP BY operation defined in a view or a derived table. A view is defined for summarizing the sales amount and the number of sales along the time and location dimensions:

```
CREATE VIEW SUMMARY (STATE, CITY, YEAR, COUNTSALES,
    SUMSALES AS (SELECT STATE, CITY, YEAR (SALES_DATE),
        COUNT(*), SUM(SALES_AMOUNT)
        FROM SALES
        GROUP BY STATE, CITY, YEAR (SALES_DATE));
```

The following query aggregates the sales information for California along the time dimension only using the above pre-defined view:

```
SELECT YEAR, SUM(COUNTSALES) As COUNTSALES,
    SUM(SUMSALES) AS SUMSALES
FROM SUMMARY
WHERE STATE = 'CA'
GROUP BY YEAR;
```

Figure 5:
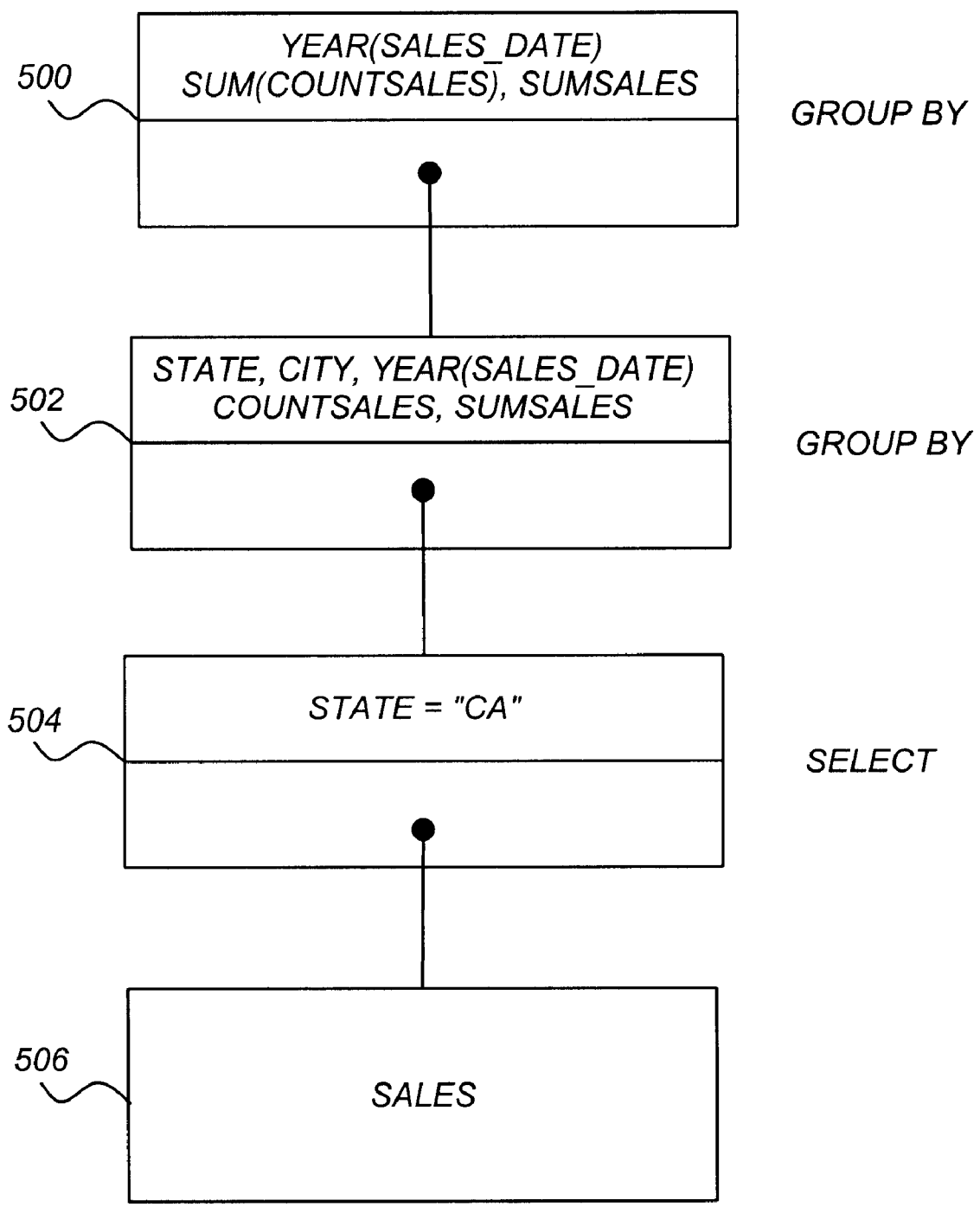

The QGM diagram is depicted in FIG. 5, where there is a GROUP BY box 500 "stacked" on top of another GROUP BY box 502 that accepts the output of a SELECT box 504 that accesses a base table 506. A traditional RDBMS typically computes the lower level of GROUP BY operation 502 (denoted as LGB) prior to the upper level of GROUP BY operation 500 (denoted as UGB).

This is unnecessary, because the query can actually be rewritten and optimized so that there is only one GROUP BY operation to be applied directly on the base table. This involves flattening the stacked GROUP BY operations as illustrated by the following:

```
SELECT YEAR (SALES_DATE), COUNT(*) AS COUNTSALES,
    SUM(SALES_AMOUNT) AS SUMSALES
FROM SALES
WHERE STATE = 'CA'
GROUP BY YEAR (SALES_DATE);
```

The conditions for such query optimization technique include the following:

1. There is no filtering to be done between the two GROUP BY operations LGB and UGB or any row filtering requirement can be applied prior to the lower GROUP BY operation LGB.
2. The grouping columns in UGB is a subset of the grouping columns in LGB.
3. The aggregate function in UGB is computable using the input to the lower GROUP BY operation LGB. For example, SUM(COUNT_SALES) can be computed as COUNT(*) over the base table 'SALES'. Similarly, SUM(SUM_SALES) can be computed as SUM (SALES_AMOUNT). The same applies to other aggregate function such as MAX( ) and MIN( ). Furthermore, when the aggregate function in UGB involves a GROUP BY column in LGB, the aggregate function remains unchanged.

It can be seen from FIG. 5 that these conditions can be met. As such, one can "collapse" the two GROUP BY operations 500 and 502 resulting in only one new GROUP BY operation which has the following properties:

1. The GROUP BY columns remain unchanged with respect to UGB.
2. The aggregate functions in UGB are written as so that the functions are computed using the input to the lower GROUP BY operation LGB.

Figure 6:
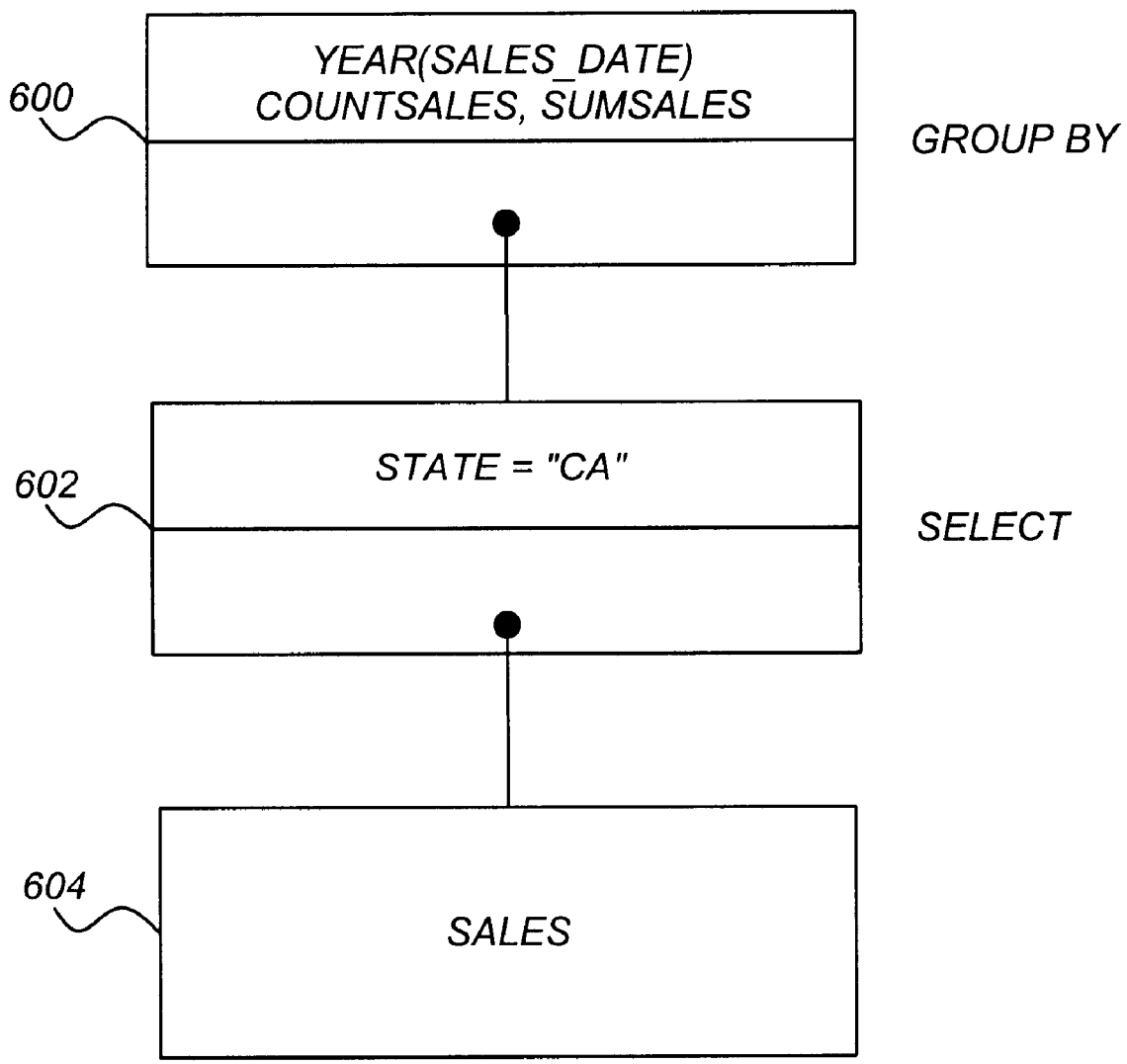

The optimized query is depicted using QGM in FIG. 6, where there is a single GROUP BY box 600 that accepts the output of a SELECT box 602 that accesses a base table 604.

LOGIC OF THE OPTIMIZATION TECHNIQUE

FIGS. 7A, 7B, 7C, and 7D together are a flowchart illustrating the method of optimizing SQL queries in step 202 of FIG. 2 and step 312 of FIG. 3 according to the preferred embodiment of the present invention. Specifically, this flowchart analyzes a query to determine whether the query includes at least one GROUP BY operation that computes at least one of the following: (1) a ROLLUP and (2) a GROUPING SET, and when it does, rewrites the query to optimize one or more predicates that are applied after the GROUP BY operation. This flowchart also analyzes a query to determine whether the query includes at least one GROUP BY operation that computes two or more stacked GROUP BY operations, and when it does, rewrites the query to collapse the stacked GROUP BY operations into a single GROUP BY operation.

Figure 7A:
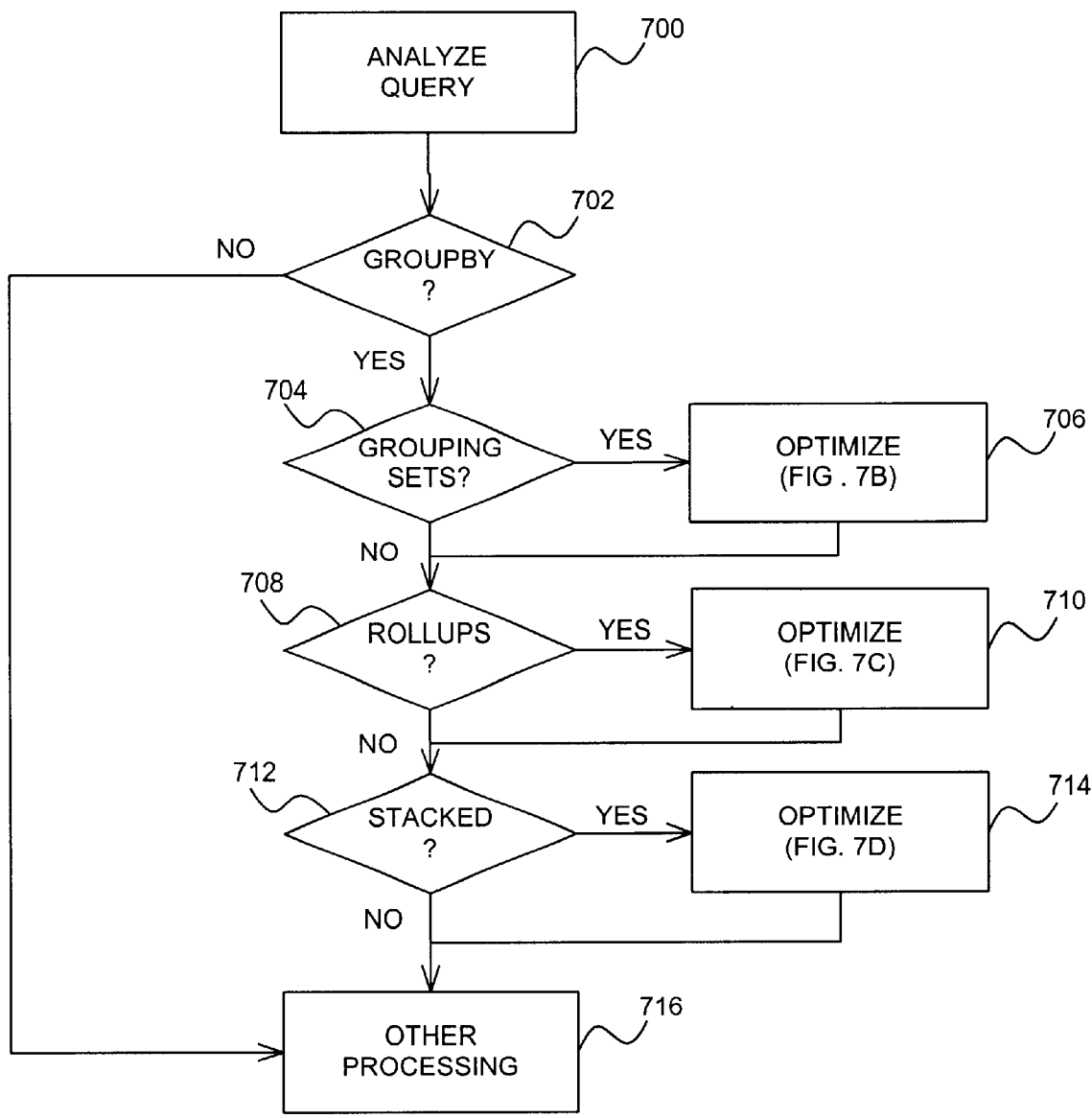
FIGS. 7A, 7B, 7C, and 7D together are a flowchart illustrating the method of optimizing SQL queries according to the preferred embodiment of the present invention.

Referring to FIG. 7A, Block 700 represents the server system 100, specifically an optimizer function of the RDBMS software 106, analyzing the query.

Block 702 is a decision block that represents the server system 100 determining whether the query includes at least one GROUP BY operation. If so, control transfers to Block 704; otherwise, control transfers to Block 716.

Block 704 is a decision block that represents the server system 100 determining whether the query includes a GROUPING SET function. If so, control transfers to FIG. 7B via Block 706; otherwise, control transfers to Block 708.

Block 708 is a decision block that represents the server system 100 determining whether the query includes a ROLLUP function. If so, control transfers to FIG. 7C via Block 710; otherwise, control transfers to Block 712.

Block 712 is a decision block that represents the server system 100 determining whether the query includes stacked GROUP BY operations. If so, control transfers to FIG. 7D via Block 714; otherwise, control transfers to Block 716.

After these query transformation steps are performed, Block 716 returns control to Block 202 in FIG. 2 or Block 312 in FIG. 3 for subsequent processing steps, including the execution of the SQL query against the relational database and the output of the result set.

Figure 7B:
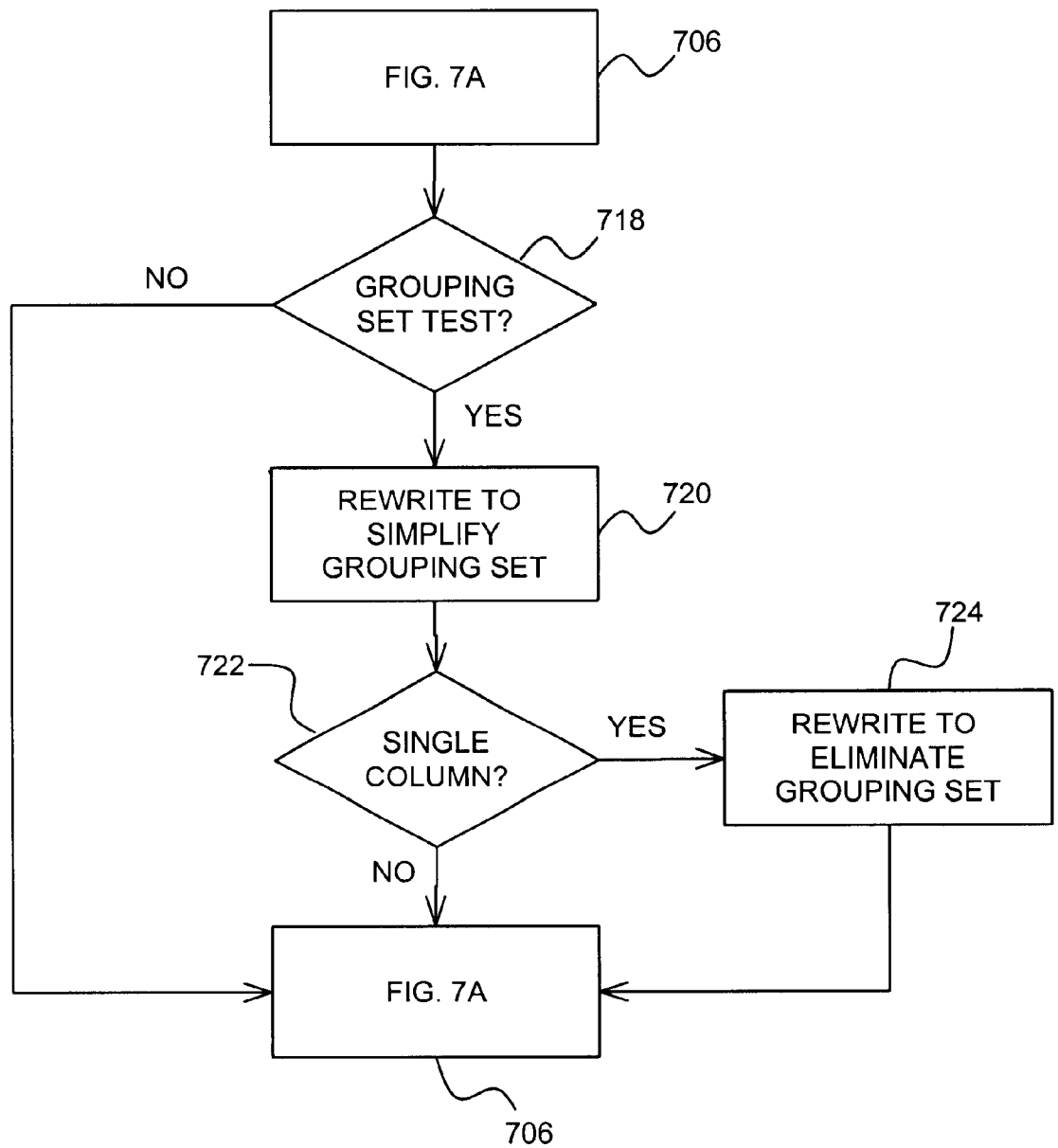

Referring to FIG. 7B, Block 718 is a decision block that represents the server system 100 performing a GROUPING SET test, i.e., determining whether the predicates that are applied after the GROUP BY operation are false when the subset of column references in the GROUPING SETS function are simultaneously null. If so, control transfers to Block 720; otherwise, control transfers back to FIG. 7A via Block 706.

Block 720 represents the server system 100 rewriting the query to simplify the GROUPING SETS function so that only a subset of column references remain in the GROUPING SETS function.

Block 722 is a decision block that represents the server system 100 determining whether the subset of column references comprises a single column referenced by the GROUP BY operation. If so, control transfers to Block 724; otherwise, control transfers back to FIG. 7A via Block 706.

Block 724 represents the server system 100 rewriting the query to eliminate the GROUPING SETS function.

Thereafter, control transfers back to FIG. 7A via Block 706.

Figure 7C:
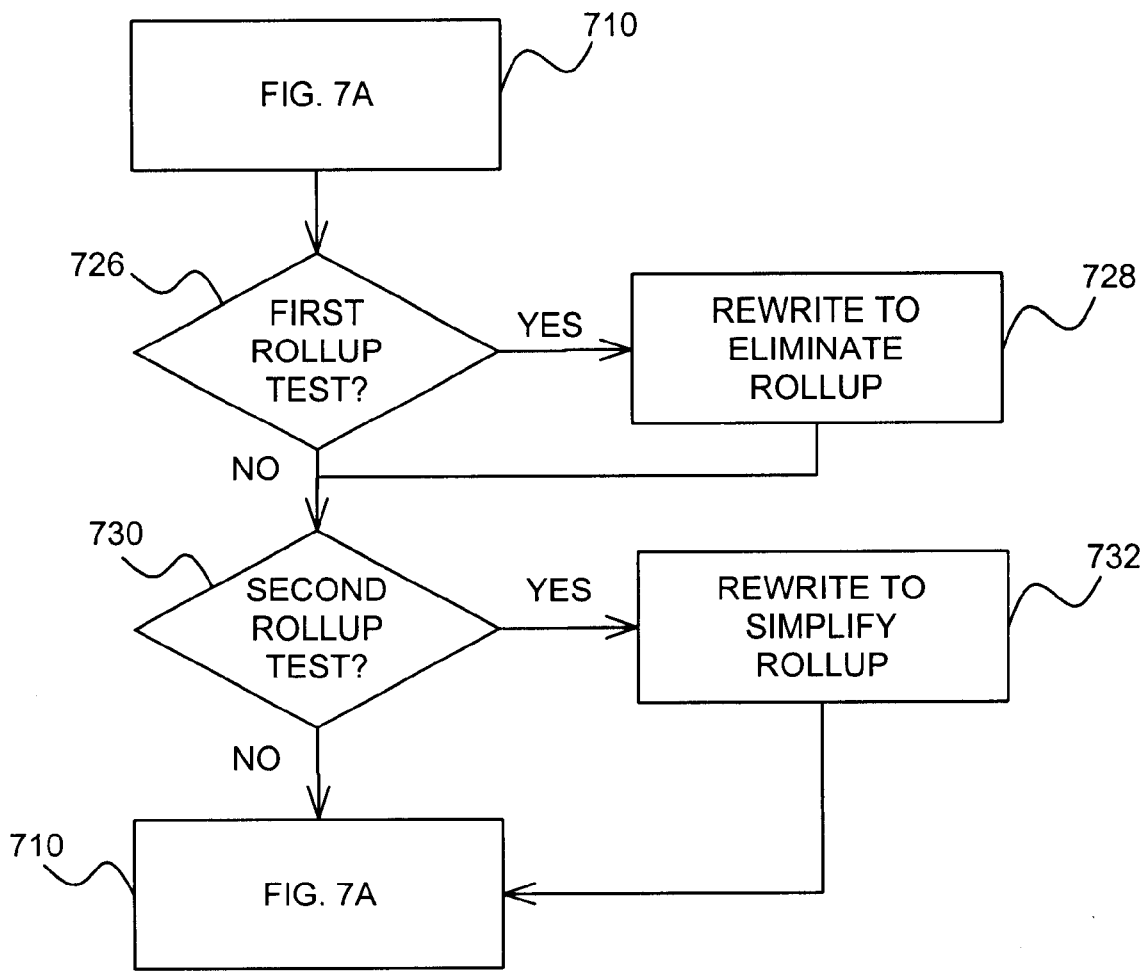

Referring to FIG. 7C, Block 726 is a decision block that represents the server system 100 performing a first ROLLUP test, i.e., determining whether the predicates that are applied after the GROUP BY operation are false when a lowest column reference in a hierarchy of column references in the ROLLUP function is null. If so, control transfers to Block 728 to rewrite the query to eliminate the ROLLUP function; otherwise, control transfers to Block 730.

Block 730 is a decision block that represents the server system 100 performing a second ROLLUP test, i.e., determining whether the predicates that are applied after the GROUP BY operation are false when a column reference in a hierarchy of column references in the ROLLUP function does not contribute to an answer set for the ROLLUP function and the column reference is not a lowest column reference in the hierarchy of column references in the ROLLUP function. If so, control transfers to Block 732 to rewrite the query to simplify the ROLLUP function.

Thereafter, control transfers back to FIG. 7A via Block 710.

Figure 7D:
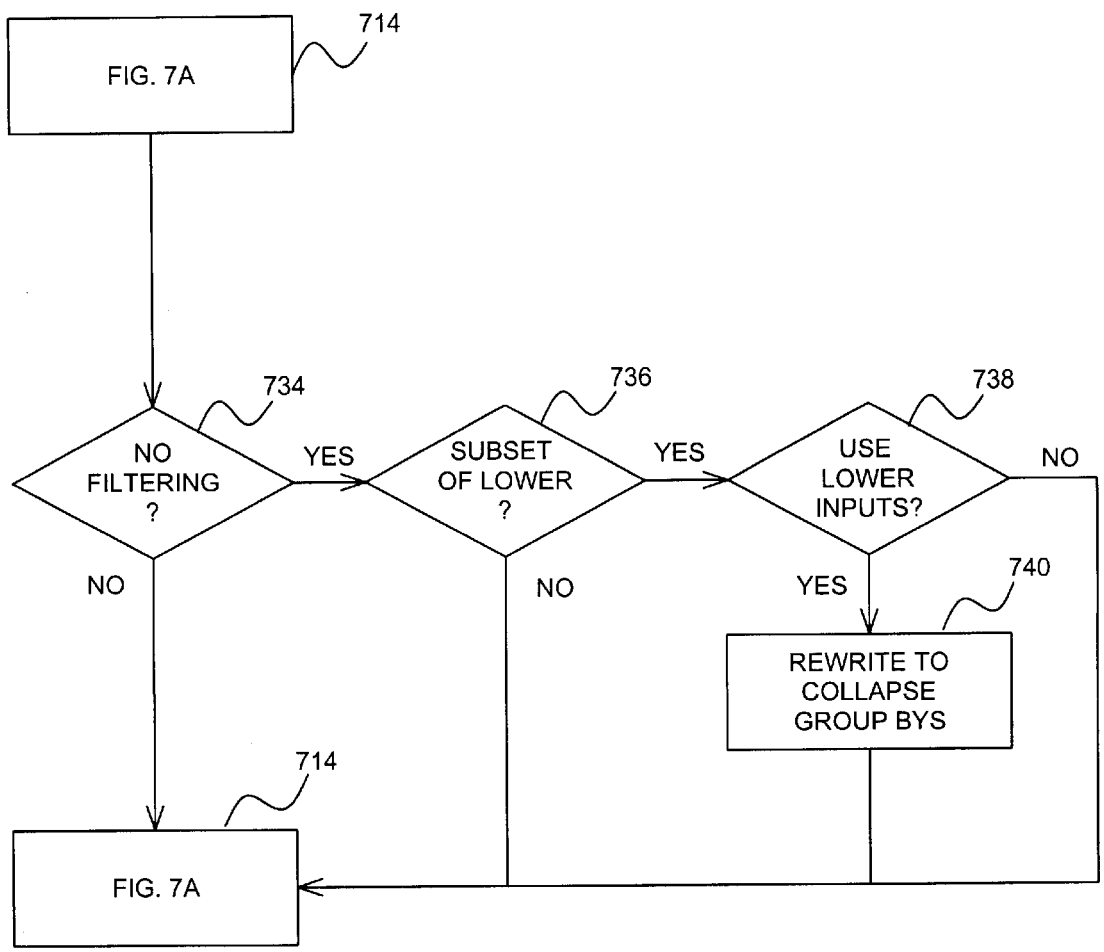

Referring to FIG. 7D, Block 734 is a decision block that represents the server system. 100 determining whether there is no filtering performed between the two stacked GROUP BY operations. If not, control transfers to Block 736; otherwise, control transfers back to FIG. 7A via Block 714.

Block 736 is a decision block that represents the server system 100 determining whether grouping columns in an upper one of the two stacked GROUP BY operations are a subset of grouping columns in the lower one of the two stacked GROUP BY operations. If not, control transfers back to FIG. 7A via Block 714; otherwise, control transfers to Block 738.

Block 738 is a decision block that represents the server system 100 determining whether any aggregate function in the upper one of the two stacked GROUP BY operations is computable using inputs to the lower one of the two stacked GROUP BY operations. If not, control transfers back to FIG. 7A via Block 714; otherwise, control transfers to Block 740.

Block 740 represents the server system 100 collapsing two stacked GROUP BY operations into a single GROUP BY operation, wherein the columns of the upper one of the two stacked GROUP BY operations are unchanged in the single GROUP BY operation and any aggregate functions in the upper one of the two stacked GROUP BY operations are written so that the aggregate functions are computed using inputs from the lower one of the GROUP BY operations.

Thereafter, control transfers back to FIG. 7A via Block 714.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing queries in a like manner (either partially or entirely) could benefit from the present invention.

In summary, the present invention discloses a method, apparatus, and article of manufacture for optimizing database queries, wherein the query is analyzed to determine whether the query includes at least one GROUP BY operation that computes at least one of the following: (1) a ROLLUP and (2) a GROUPING SET, and when it does, the query is rewritten to optimize one or more predicates that are applied after the GROUP BY operation. The query is also analyzed to determine whether the query includes at least one GROUP BY operation that computes two or more stacked GROUP BY operations, and when it does, the query is rewritten to collapse the stacked GROUP BY operations into a single GROUP BY operation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of optimizing a query in a computer system, the query being performed by the computer system to retrieve data from a database stored on a data storage device, the method comprising:
    (a) analyzing the query to determine whether the query includes at least one GROUP BY operation that computes at least one of the follows: (1) a ROLLUP function and (2) a GROUPING SETS function; and
    (b) when the query includes at least one GROUP BY operation that computes at least one of the following: (1) a ROLLUP function and (2) a GROUPING SETS function, rewriting the query to optimize one or more predicates that are applied after the GROUP BY operation.

2. The method of claim 1, wherein the rewriting step comprises:
    simplifying the GROUPING SETS function so that only a subset of column references remain in the GROUPING SETS function, when it s determined that the predicates that are applied after the GROUP BY operation are false when the subset of column references in the GROUPING SETS function are simultaneously null.

3. The method of claim 2, wherein the simplifying step comprises:
    eliminating the GROUPING SETS function when the subset of column references comprises a single column referenced by the GROUP BY operation.

4. The method of claim 1, wherein the rewriting step comprises:
    eliminating the ROLLUP function, when it is determined that the predicates that are applied after the GROUP BY operation are false when a lowest column reference in a hierarchy of column references in the ROLLUP function is null.

5. The method of claim 1, wherein the rewriting step comprises:
    eliminating the ROLLUP function, when it is determined that the predicates that are applied after the GROUP BY operation are false when a column reference in a hierarchy of column references in the ROLLUP function does not contribute to an answer set for the ROLLUP function and the column reference is not a lowest column reference in the hierarchy of column references in the ROLLUP function.

6. A computer-implemented apparatus for optimizing a query, comprising:
    (a) a computer system, wherein the query is performed by the computer system to retrieve data from a database stored on a data storage device;
    (b) logic, performed by the computer system, for analyzing the query to determine whether the query includes at least one GROUP BY operation that computes at least one of the following: (1) a ROLLUP function and (2) a GROUPING SETS function; and
    (b) logic, performed by the computer system, for rewriting the query to optimize one or more predicates that are applied after the GROUP BY operation, when the query includes at least one GROUP BY operation that computes at least one of the following: (1) a ROLLUP fixation and (2) a GROUPING SETS function.

7. The apparatus of claim 6, wherein the logic for rewriting comprises:
    logic for simplifying the GROUPING SETS function so that only a subset of column references remain in the GROUPING SETS function, when it is determined that the predicates that are applied after the GROUP BY operation are false when the subset of column references in the GROUPING SET function are simultaneously null.

8. The apparatus of claim 7, wherein the logic for simplifying comprises:
    logic for eliminating the GROUPING SETS function when the subset of column references comprises a single column referenced by the GROUP BY operation.

9. The apparatus of claim 6, wherein the logic for rewriting comprises:
    logic for eliminating the ROLLUP function, when it is determined that the predicates that are applied after the GROUP BY operation are false when a lowest column reference in a hierarchy of column references in the ROLLUP function is null.

10. The apparatus of claim 6, wherein the logic for rewriting comprises:
    logic for eliminating the ROLLUP function, when it is determined that the predicates that are applied after the GROUP BY operation are Use when a column reference in a hierarchy of column references in the ROLLUP function does not contribute to an answer set for the ROLLUP function and the column reference is not a lowest column reference in the hierarchy of column references in the ROLLUP function.

11. An article of manufacture embodying logic for performing a method of optimizing a query, the query being performed to retrieve data from a database stored in a data storage device, the method comprising:
    (a) analyzing the query to determine whether the query includes at least one GROUP BY operation that computes at least one of the following: (1) a ROLLUP function and (2) a GROUPING SETS function; and
    (b) when the query includes at least one GROUP BY operation that computes at least one of the following: (1) a ROLLUP function and (2) a GROUPING SETS function, rewriting the query to optimize one or more predicates that are applied after the GROUP BY operation.

12. The article of manufacture of claim 11, wherein the rewriting step comprises:
   simplifying the GROUPING SETS function so that only a subset of column references remain in the GROUPING SETS function, when it is determined that the predicates that are applied after the GROUP BY operation are false when the subset of column references in the GROUPING SETS function are simultaneously null.

13. The article of manufacture of claim 12, wherein the simplifying step comprises:
   eliminating the GROUPING SETS function when the subset of column references comprises a single column referenced by the GROUP BY operation.

14. The article of manufacture of claim 11, wherein the rewriting step comprises:
   eliminating the ROLLUP function, when it is determined that the predicates that are applied after the GROUP BY operation are false when a lowest column reference in a hierarchy of column references in the ROLLUP function is null.

15. The article of manufacture of claim 11, wherein the rewriting step comprises:
   eliminating the ROLLUP function, when it is determined that the predicates that are applied after the GROUP BY operation are false when a column reference in a hierarchy of column references in the ROLLUP function does not contribute to an answer set for the ROLLUP function and the column reference is not a lowest column reference in the hierarchy of column references in the ROLLUP function.

16. A method of optimizing a query in a computer system, the query being performed by the computer system to retrieve data from a database stored on a data storage device, the method comprising:
   (a) analyzing the query to determined whether the query includes at least one GROUP BY operation that computes two or more stacked GROUP BY operations; and
   (b) when the query includes at least one GROUP BY operation that computes two or more stacked GROUP BY operations, rewriting the query to collapse the stacked GROUP BY operations into a single GROUP BY operation.

17. The method of claim 16, wherein the rewriting step comprises:
   collapsing the stacked GROUP BY operations into a single GROUP BY operation, when there is no filtering performed between the two stacked GROUP BY operations, when any row filtering can be performed prior to a lower one of the two stacked GROUP BY operations, when grouping columns in an upper one of the two stacked GROUP BY operations are a subset of grouping columns in the lower one of the two stacked GROUP BY operations, and when any aggregate function in the upper one of the two stacked GROUP BY operations is computable using inputs to the lower one of the two stacked GROUP BY operations;
   wherein the columns of the upper one of the two stacked GROUP BY operations are unchanged in the single GROUP BY operation and any aggregate functions in the upper one of the two stacked GROUP BY operations are written so that the aggregate functions are computed using inputs from the lower one of the GROUP BY operations.

18. A computer-implemented apparatus for optimizing a query, comprising:
   (a) a computer system, wherein the query is performed by the computer system to retrieve data from a database stored on a data storage device;
   (b) logic, performed by the computer system, for analyzing the query to determine whether the query includes at least one GROUP BY operation that computes two or more stacked GROUP BY operations; and
   (b) logic, performed by the computes system, for rewriting the query to collapse the stacked GROUP BY operations into a single GROUP BY operation, when the query includes at least one GROUP BY operation that computes two or sore stacked GROUP BY operations.

19. The apparatus of claim 18, wherein the logic for rewriting comprises:
   logic for collapsing the stacked GROUP BY operations into a single GROUP BY operation, when there is no filtering performed between the two stacked GROUP BY operations, when any row filtering can be performed prior to a lower one of the two stacked GROUP BY operations, when grouping columns in an upper one of the two stacked GROUP BY operations are a subset of grouping columns in the lower one of the two stacked GROUP BY operations, and when any aggregate function in the upper one of the two stacked GROUP BY operations is computable using inputs to the lower one of the two stacked GROUP BY operations;
   wherein the columns of the upper one of the two stacked GROUP BY operations are unchanged in the single GROUP BY operation and any aggregate functions in the upper one of the two stacked GROUP BY operations are written so that the aggregate functions are computed using inputs from the lower one of the GROUP BY operations.

20. An article of manufacture embodying logic for performing a method of optimizing a query, the query being performed to retrieve data from a database stored in a data storage device, the method comprising:
   (a) analyzing the query to determine whether the query includes at least one GROUP BY operation that computes two or more stacked GROUP BY operations; and
   (b) when the query includes at least one GROUP BY operation that computes two or more stacked GROUP BY operations, rewriting the query to collapse the stacked GROUP BY operations into a single GROUP BY operation.

21. The article of manufacture of claim 20, wherein the rewriting step comprises:
   collapsing the stacked GROUP BY operations into a single GROUP BY operation, when there is no filtering performed between the two stacked GROUP BY operations, when any row filtering can be performed prior to a lower one of the two stacked GROUP BY operations, when grouping columns in an upper one of the two stacked GROUP BY operations are a subset of grouping columns in the lower one of the two stacked GROUP BY operations, and when any aggregate function in the upper one of the two stacked GROUP BY operations is computable using inputs to the lower one of the two stacked GROUP BY operations;
   wherein the columns of the upper one of the two stacked GROUP BY operations are unchanged in the single GROUP BY operation and any aggregate functions in the upper one of the two stacked GROUP BY operations are written so that the aggregate functions are computed using inputs from the lower one of the GROUP BY operations.

* * * * *

UNITED STATES PATENT AND TRADEMARK OFFICE
CERTIFICATE OF CORRECTION

PATENT NO. : 6,574,623 B1
DATED : June 3, 2003
INVENTOR(S) : Ting Yu Leung and Haixun Wang It is certified that error appears in the above-identified patent and that said Letters Patent is hereby corrected as shown below:

Column 15,
Line 34, "follows" should read -- following --

Column 16,
Line 22, "fixation" should read -- function --
Line 48, "Use" should read -- false --

Column 17,
Line 35, "determined" should read -- determine --

Signed and Sealed this

Seventh Day of October, 2003

JAMES E. ROGAN
*Director of the United States Patent and Trademark Office*